United States Patent
Sato et al.

[11] Patent Number: 5,287,187
[45] Date of Patent: Feb. 15, 1994

[54] VIDEO SIGNAL PROCESSING APPARATUS DISPLAYING IMAGE AND PROCESS INFORMATION

[75] Inventors: Chikara Sato, Kawasaki; Hisataka Hirose; Yoshihiro Nakatani, both of Yokohama; Tadayoshi Nakayama, Tokyo; Tsutomu Fukatsu, Yokohama; Kyoji Tamura, Kawasaki, all of Japan

[73] Assignee: Canon Kabushiki Kaisha, Tokyo, Japan

[21] Appl. No.: 522,811

[22] Filed: May 14, 1990

[30] Foreign Application Priority Data

May 15, 1989 [JP] Japan .................................. 1-122620
Jun. 22, 1989 [JP] Japan .................................. 1-158234

[51] Int. Cl.$^5$ ........................................... H04N 5/262
[52] U.S. Cl. ..................................... 348/595; 348/239
[58] Field of Search ............... 358/176, 181, 180, 185, 358/183, 182, 139; 340/721, 722, 802; H04N 5/222, 5/262, 5/265, 5/260, 5/268, 5/272

[56] References Cited

U.S. PATENT DOCUMENTS

| | | | |
|---|---|---|---|
| 3,627,914 | 12/1971 | Davies et al. | 358/185 |
| 3,783,188 | 1/1974 | Hurford | 358/182 |
| 4,158,857 | 6/1979 | Hiraguri | 358/139 |
| 4,340,903 | 7/1982 | Tamura | 358/181 |
| 4,356,511 | 10/1982 | Tsujimura | 358/181 |
| 4,471,348 | 9/1984 | London et al. | 340/72.2 |
| 4,507,683 | 3/1985 | Griesshaber et al. | 358/183 |
| 4,698,664 | 10/1987 | Nichols et al. | 358/185 |
| 4,823,183 | 4/1989 | Jackson et al. | 358/183 |
| 4,825,250 | 4/1989 | Miyata et al. | 355/218 |
| 4,891,702 | 1/1990 | Nakayama et al. | 358/140 |
| 4,935,814 | 6/1990 | Dmoto et al. | 358/139 |
| 5,003,404 | 3/1991 | Yoshimura et al. | 358/182 |
| 5,055,924 | 10/1991 | Skutta | 358/182 |

FOREIGN PATENT DOCUMENTS

| | | | |
|---|---|---|---|
| 0043980 | 2/1987 | Japan | H04N 5/262 |
| 0176273 | 8/1987 | Japan | H04N 5/262 |
| 0015788 | 1/1990 | Japan | H04N 5/278 |
| 0111180 | 4/1990 | Japan | H04N 5/262 |

*Primary Examiner*—James J. Groody
*Assistant Examiner*—Jeffrey S. Murrell
*Attorney, Agent, or Firm*—Fitzpatrick, Cella, Harper & Scinto

[57] ABSTRACT

A video signal processing device displaying both image and process information includes multiplexing circuitry for multiplexing a second video signal with a first video signal. Control circuitry is provided for controlling a multiplexing ratio of the first and second video signals in the multiplexing circuitry. A display is provided for simultaneously displaying at least a part of a video image which corresponds to the first video signal, and also for displaying a state of the multiplexing operation being performed by the multiplexing circuitry under the control of the control circuitry. Preferably, only a peripheral portion of the image is faded in the view finder. Alternatively, a bar graph on the side of the image in the view finder indicates the degree of fading the image is subjected to.

15 Claims, 9 Drawing Sheets

VIDEO SIGNAL PROCESSING APPARATUS DISPLAYING IMAGE AND PROCESS INFORMATION

BACKGROUND OF THE INVENTION

1. Field of the Invention

The present invention relates to a video signal processing apparatus for processing video signals.

2. Related Background Art

Hitherto, as a method of switching a plurality of kinds of video images on screen, there has been known an apparatus for switching video images by a special effects such as wipe or fade.

On the other hand, in recent years, in an apparatus in which a video camera and a recording apparatus are integral, an apparatus having a video image editing function such as wipe, fade, or the like as mentioned above has been put into practical use.

However, the apparatus as mentioned above has, for instance, a memory circuit. An arbitrary still image is previously stored in the memory circuit, a video signal corresponding to the still image stored in the memory circuit and a video signal corresponding to an object image which is formed by a video camera unit are switched by sequentially changing switching timings or mixed by sequentially changing a mixture ratio, and the resultant switched or mixed signal is output, thereby accomplishing a special effect such as wipe or fade.

During the execution of the above special effect, a state of the special effect is displayed on an electric view finder (EVF) of the apparatus. However, at the start of the special effect, a still image stored in the memory circuit in the apparatus is displayed on the EVF. The image corresponding to the video signal which is formed by the video camera unit cannot be monitored by the EVF and the using efficiency is low.

On the other hand, hitherto, as one of special functions which the video camera has, there is a fading function such that the video signal obtained from an image pickup device is gradually erased and the whole picture plane is set to the white or black level, or on the contrary, the video signal is gradually mixed with the white or black picture plane.

FIG. 1 is a constructional diagram showing a construction of a conventional image pickup apparatus. In FIG. 1, reference numeral 1 denotes an image pickup device to convert a video image which was input through a lens into a video signal; 2 indicates a sample and hold (S/H) circuit to sample and hold the video signal which was output from the image pickup device 1; 3 is an auto gain control (AGC) circuit to execute an automatic gain control process, a gamma process, and the like on the video signal which is output from the S/H circuit 2; 4 is a multiplexing circuit to multiplex a synchronizing (or sync) signal with the video signal; 5 is a fading circuit to execute the fading operation; 6 is a driving circuit to generate a drive pulse to drive the image pickup device 1; 7 is a synchronism signal generating circuit to generate a sync signal, clamp pulse, and the like; 9 is a time constant circuit to provide a time constant so that a video image gradually changes upon fading; 10 is a switch to activate the start of the fading operation; 11 is a recording unit with record the video signal to which the sync signal was multiplexed and which is output from the multiplexing circuit 4; and 12 is an electric view finder (EVF) unit to display the video signal which is output from the multiplexing circuit 4.

The operation of the apparatus shown in FIG. 1 will now be described hereinbelow.

First, the video signal obtained from the image pickup device 1 is sampled and held by the S/H circuit 2 and, thereafter, is subjected to the AGC and gamma processes by the AGC circuit 3 and the processed signal is input to the fading circuit 5. By turning on the switch 10, the fading circuit 5 makes the fading function operative in accordance with a fade control signal which is output from the time constant circuit 9, thereby executing the fading process on the video signal. The fading-processed video signal is supplied to the multiplexing circuit 4. After that, the sync signal is multiplexed with the faded video signal by the multiplexing circuit 4 and the multiplexed signal is output to the recording unit 11 and also supplied to the EVF unit 12. The photographed video image can be confirmed by the EVF unit 12 during the photographing and recording in the recording unit 11.

As mentioned above, in the conventional apparatus, in the case where the fading function is made operative, the video signal which is input to the EVF unit 12 has already been fading-processed by the fading circuit 5, so that the picture plane in the EVF unit 12 is set to a whole white or black image in accordance with the fade control signal. Therefore, in the fading state, the photographer cannot check the video image which is output from the image pickup device 1. Particularly, in the case where the video signal is gradually mixed from the fading state in which the picture plane is set to a whole white or black image and the photographing and recording operations are started (at the time of fade-in), the video image in which the photographing and recording operations are started cannot be checked. Thus, there is a problem such that the fading function cannot be effectively used because the photographing and recording operations are started with a video image different from an image desired by the photographer.

SUMMARY OF THE INVENTION

It is an object of the invention to provide a video signal processing apparatus which can solve the above problems.

Another object of the invention is to provide a video signal processing apparatus which can easily monitor the multiplexing operation of two kinds of video signals.

Under such objects, according to the invention, as one embodiment, there is provided a video signal processing apparatus for processing video signals, comprising: multiplexing means for multiplexing a second video signal with a first video signal; control means for controlling a multiplexing ratio of the first and second video signals in the multiplexing means; and display means for displaying at least a part of a video image which corresponds the first video signal and also displaying a control operating state in the control means.

Another object of the present invention is to provide a video signal processing apparatus in which prior to starting the recording operation for multiplexing and recording two kinds of video signals, two kinds of video images which are expressed by the two kinds of video signals can be monitored and a using efficiency is high.

Under such an object, according to the invention, as one embodiment, there is provided a video signal processing apparatus for processing video signals, comprising: multiplexing means for multiplexing a second video signal with a first video signal and outputting the multiplexed video signal; display means for displaying a video image corresponding to the video signal which is output from the multiplexing means; recording means for recording the video signal which is output from the multiplexing means onto a recording medium; and control means for equalizing multiplexing ratios of the first and second video signals in the multiplexing means prior to the recording operation of the video signal in the recording means.

A further object of the present invention is to provide an image pickup apparatus in which, in a fading operation, both the fading operation and an image pickup video image to be faded in or out can be respectively monitored and a using efficiency is high.

Under such an object, according to the invention, as one embodiment, there is provided an image pickup apparatus for photographing an object and generating an image pickup video signal corresponding to the object, comprising: fading means for fading in or out the image pickup video signal; control means for controlling a fading operation of the image pickup video signal in the fading means; and display means for displaying at least a part of the photographed video image which is expressed by the image pickup video signal and also displaying a control operating state in the control means.

The above and other objects and features of the present invention will become apparent from the following detailed description and the appended claims with reference to the accompanying drawings.

BRIEF DESCRIPTION OF THE PREFERRED EMBODIMENTS

Figure 2:
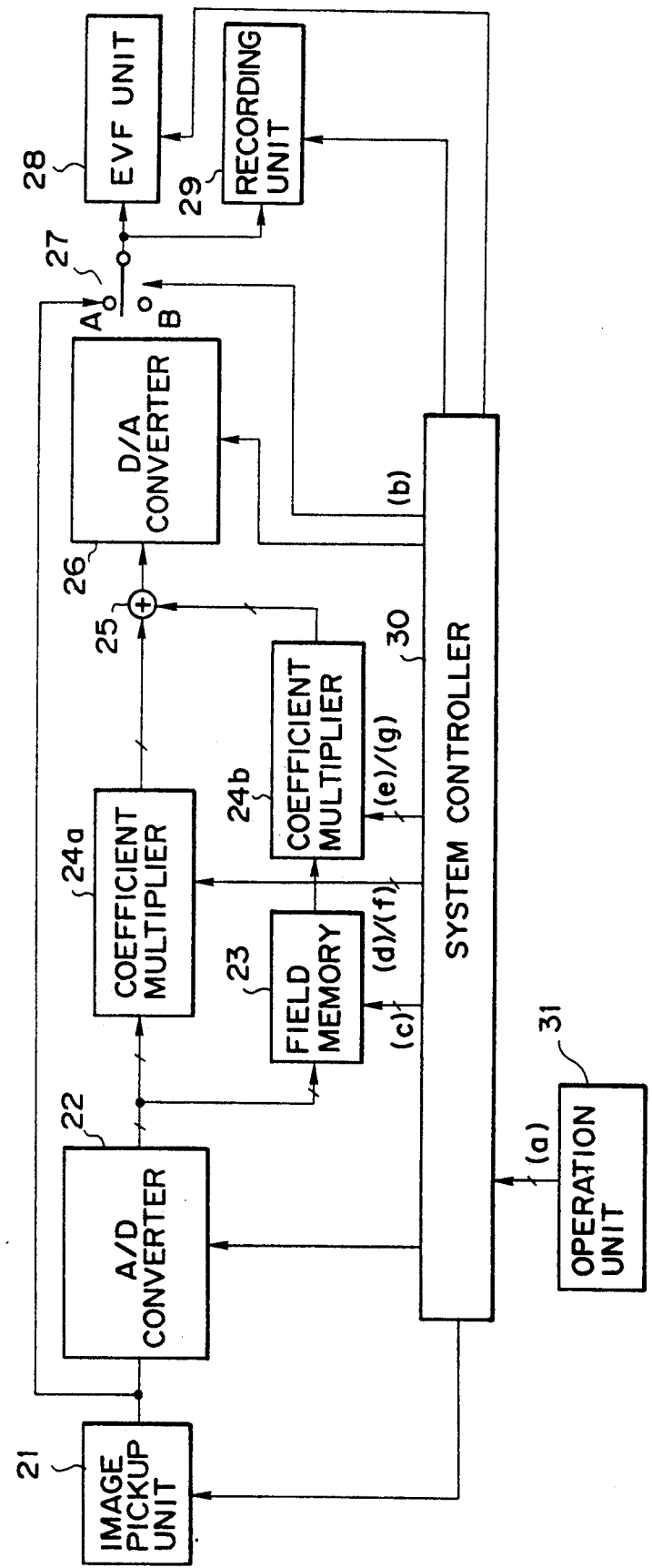
FIG. 2 is a block diagram showing a schematic construction of a video signal processing apparatus as the first embodiment of the present invention.
Figure 3:
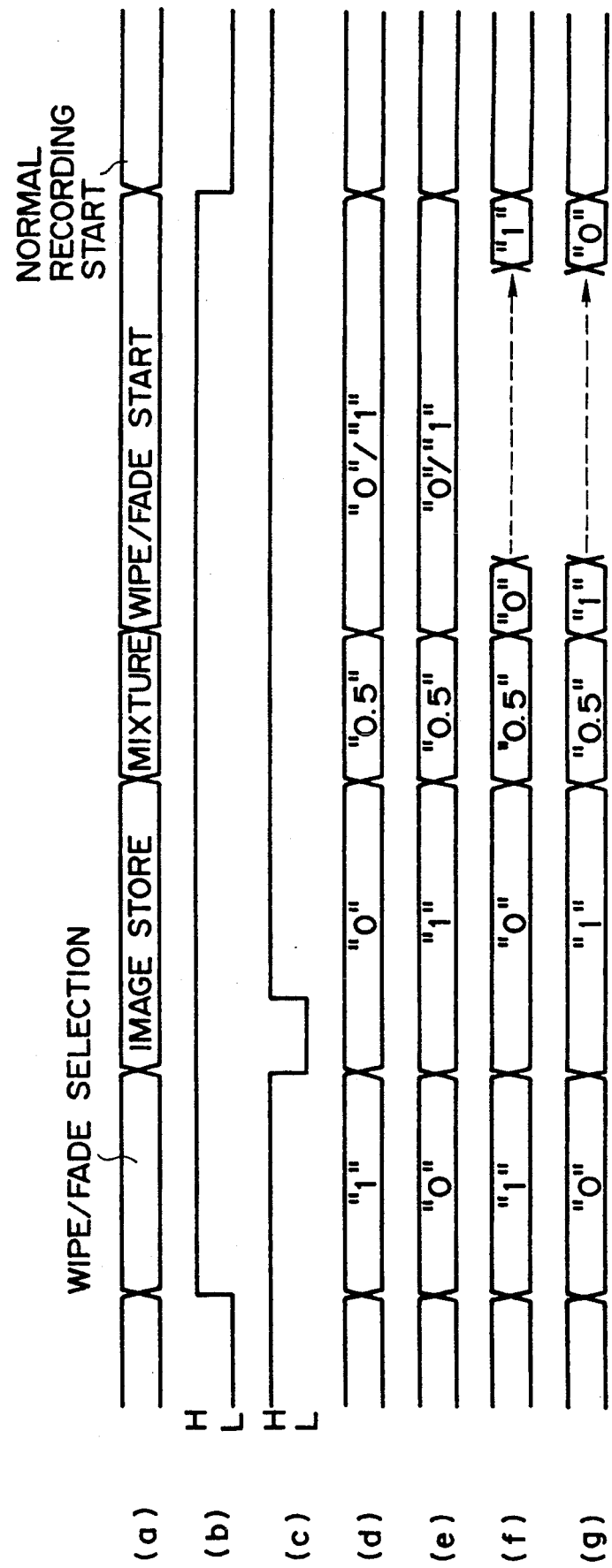
FIG. 3 is a timing chart for explaining the operation of the apparatus shown in FIG. 2.

The present invention will be described hereinbelow with respect to the first embodiment of the invention. FIG. 2 is a block diagram showing a schematic construction of a video signal processing apparatus as the first embodiment of the invention. FIG. 3 is a timing chart for explaining the operation of the apparatus shown in FIG. 2.

In FIG. 2, reference numeral 21 denotes an image pickup unit for forming a video signal by photographing an object and outputting an output signal; 22 indicates an analog/digital (A/D) converter for converting the analog video signal to the digital video signal; 23 is a field memory which can store the digital video signal of one field; 24a and 24b are coefficient multipliers; 25 is a full adder (multiplexer); 26 is a digital/analog (D/A) converter for converting the digital video signal to the analog video signal; 27 is a change-over switch; 28 is an electric view finder unit (EVF unit); 29 is a recording unit to record the input video signal onto a recording medium; 30 is a system controller to control the operation of each circuit; and 31 is an operation unit to convey each operation to the system controller.

In FIG. 2, first, when the start of normal photographing and recording operations is conveyed to the system controller 30 by manual operation of the operating unit 31, the system controller 30 makes the image pickup unit 21, EVF unit 28, and recording unit 29 operative and connects the change-over switch 27 to the A side in the diagram and supplies the video signal corresponding to the object image which is output from the image pickup unit 21 to the EVF unit 28 and recording unit 29.

In the EVF unit 28, the video image corresponding to the object which was photographed by the image pickup unit 21 is displayed. In the recording unit 29, on the other hand, the video signal which is output from the image pickup unit 21 is recorded onto a recording medium (not shown).

In the operation unit 31, as shown in FIG. 3(a), when the wiping or fading operation is selected, the system controller 30 makes operative the image pickup unit 21, A/D converter 22, D/A converter 26, and EVF unit 28. On the other hand, the system controller 30 sets a control signal (b) which is output to the switch 27 in the high (H) level (refer to FIG. 3(b)) and switches the switch 27 from the A side to the B side in the diagram. At this time, coefficient data indicative of a coefficient "1" is output from the system controller 30 to the coefficient multiplier 24a (refer to FIGS. 3(d) and 3(f)). Coefficient data indicative of a coefficient "0" is output to the coefficient multiplier 24b (refer to FIGS. 3(e) and 3(g)).

The video signal which had been output from the image pickup unit 21 and was converted into the digital signal by the A/D converter 22 is then multiplied with the coefficient "1" by the coefficient multiplier 24a by the above operations. In the full adder 25, this video signal is added to the signal which was multiplied with the coefficient "0" by the coefficient multiplier 24b. After that, the added signal is supplied to the D/A converter 26 and converted into the analog signal by the D/A converter 26. The analog video signal is then supplied to the EVF unit 28 through the switch 27. Thus, an image shown by the video signal which is output from the image pickup unit 21 is displayed by the EVF unit 28.

Then, as shown in FIG. 3(a), when the image storing operation is designated by the operation unit 31, a control signal (c) which was supplied from the system controller 30 to the field memory 23 changes from the high (H) level to the low (L) level for one field period of time as shown in FIG. 3(c). For the period of time when the control signal (c) is at the low (L) level, the field memory 23 is set into the storing mode. Thus, the video signal which had been output from the image pickup unit 21 and was converted into the digital signal by the A/D converter 22 is stored into the field memory 23 by an amount of one field. After the video signal of one field was stored, when the control signal (c) is set to the H level, the video signal stored in the field memory 23 is repetitively read out.

At this time, coefficient data indicative of the coefficient "0" is output from the system controller 30 to the coefficient multiplier 24a (refer to FIGS. 3(d) and 3(f)). Coefficient data indicative of the coefficient "1" is output to the coefficient multiplier 24b (refer to FIGS. 3(e) and 3(g)). The video signal which had been read out of the field memory 23 and was multiplied with the coefficient "1" by the multiplier 24b is added to the signal multiplied with the coefficient "0" by the multiplier 24a by the full adder 25. After that, the added signal is supplied to the D/A converter 26. The video signal converted into the analog signal by the D/A converter 26 is supplied to the EVF unit 28 through the switch 27. The still image shown by the video signal which was read out of the field memory 23 is displayed by the EVF unit 28.

The still image shown by the video signal which was read out of the field memory 23 is displayed by the EVF unit 28 for a predetermined period of time after the image storing operation was designated by the operation unit 31. After that, a mixing operation is conveyed from the operation unit 31 to the system controller 30.

When the mixing operation is commanded by the operation unit 31, the system controller 30 outputs coefficient data indicative of the coefficient "0.5" to the coefficient multiplier 24a (refer to FIGS. 3(d) and 3(f)) and outputs coefficient data indicative of the coefficient "0.5" to the coefficient multiplier 24b (refer to FIGS. 3(e) and 3(g)). The video signal which had been output from the image pickup unit 21 and was converted into the digital signal by the A/D converter 22 is further multiplied with the coefficient "0.5" by the multiplier 24a. This video signal is added to the video signal which had been read out of the field memory 23 and was multiplied with the coefficient "0.5" by the multiplier 24b by the full adder 25, so that those video signals are mixed.

The mixed video signal is supplied to the D/A converter 26 and converted into the analog signal by the D/A converter 26. After that, the analog signal is supplied to the EVF unit 28 through the switch 27. An image shown by the mixed video signal in which the video signal which had been output from the image pickup unit 21 and the still image signal stored in the field memory 23 were mixed is displayed by the EVF unit 28.

By the above operations, the operator can check that the wiping or fading operation has been selected. Moreover, the photographed image in the wipe or fade recording mode can be monitored by the EVF unit 28. When a photographed image to be wipe- or fade-recorded is determined by the foregoing operations, the operator operates the operation unit 31 and conveys the start of wipe or fade recording to the system controller 30 as shown in FIG. 3(a).

In the operation unit 31, when the start of the wipe or fade recording is designated, the system controller 30 makes the recording unit 29 operative and changes a switching timing of a combination of the coefficient data which are supplied to the coefficient multipliers 24a and 24b on the basis of one field period in accordance with the kind of wiping or fading operation (refer to FIGS. 3(d) to 3(g)). Thus, the digital image pickup video signal which was subjected to the wiping or fading process by the still image signal is supplied to the D/A converter 26 and is converted into the analog signal. The analog signal is then supplied to the EVF unit 28 and recording unit 29 through the switch 27. The image which was wipe- or fade-processed is displayed by the EVF unit 28 and is also recorded onto a recording medium by the recording unit 29.

Further, the above wipe or fade processing operation will now be described in detail with reference to FIGS. 4 to 6.

Figure 4:
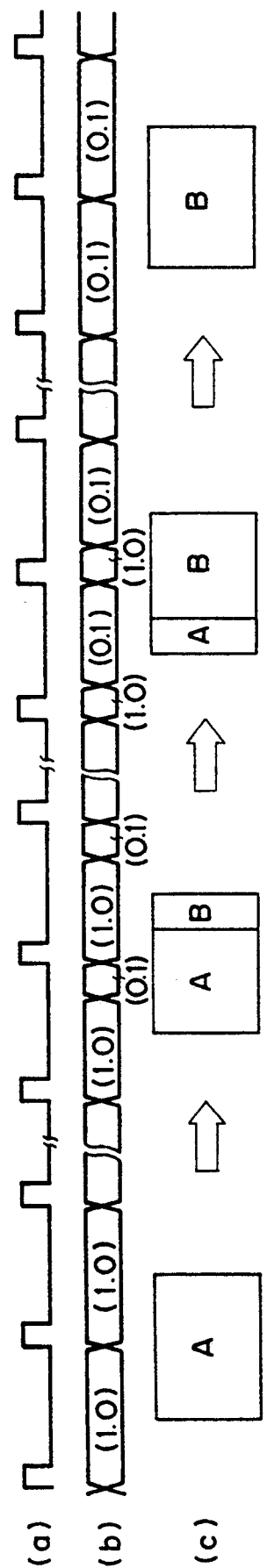
FIG. 4 is an operation timing chart in the horizontal wiping operation.

FIG. 4 shows an operation timing chart in the case of executing the wiping operation in the horizontal direction. In FIG. 4, (a) shows a horizontal sync signal, (b) indicates a combination of the coefficient data which are supplied to the coefficient multipliers 24a and 24b by the system controller 30, and (c) shows a horizontal wipe image which is displayed on the screen of the EVF unit 28.

Now, it is assumed that a coefficient of the coefficient data which is supplied to the multiplier 24a by the system controller 30 is set to X, a coefficient of the coefficient data which is supplied to the multiplier 24b is set to Y, and a combination of the coefficient data is expressed by (X, Y). A combination of the coefficient data which are output from the system controller 30 in the case of the horizontal wipe recording is synchronized with a horizontal sync signal shown in FIG. 4(a). As shown in FIG. 4(b), combinations of the coefficient data which are assigned to the horizontal scanning periods in each field period are equalized. The combination of the coefficient data is changed from (1, 0) to (0, 1) on the basis of the field period. Due to this, horizontal wipe images shown in FIG. 4(c) are displayed by the EVF 28 and recorded onto the recording medium.

Figure 5:
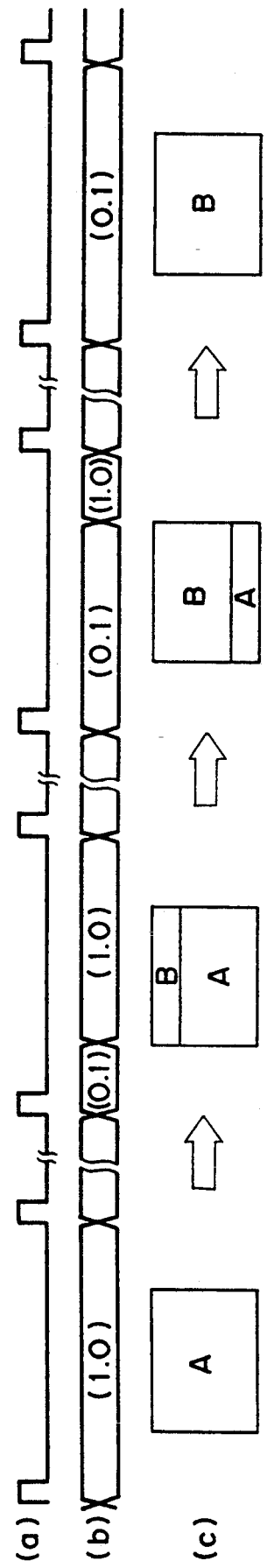
FIG. 5 is an operation timing chart in the vertical wiping operation.

On the other hand, FIG. 5 shows an operation timing chart in the case of executing the wiping operation in the vertical direction; (a) denotes a vertical sync signal; (b) indicates a combination of the coefficient data which are supplied from the system controller 30 to the coefficient multipliers 24a and 24b; and (c) shows vertical wipe images which are displayed on the screen of the EVF unit 28.

In a manner similar to the above, a combination of the coefficient data which are output from the system controller 30 becomes (X, Y). A combination of the coefficient data which are output from the system controller 30 in the case of the vertical wipe recording is synchronized with a vertical sync signal shown in FIG. 5(a). A ratio of the combinations of the coefficient data which are assigned to the horizontal scanning periods is changed on the basis of the field period. Due to this, vertical wipe images shown in FIG. 5(c) are displayed by the EVF unit 28 and recorded onto the recording medium.

Figure 6:
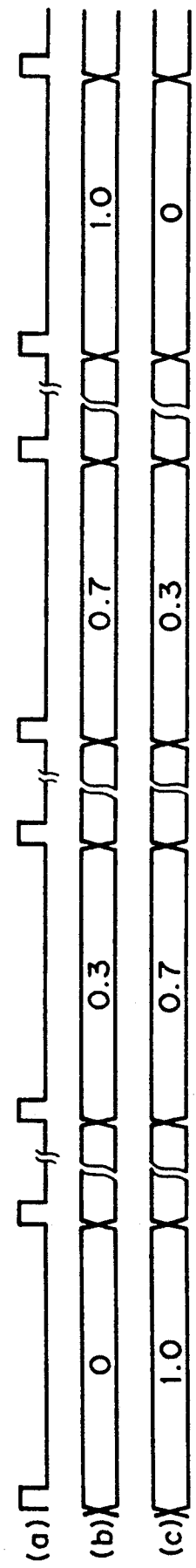
FIG. 6 is an operation timing chart in the fading operation.

On the other hand, FIG. 6 shows an operation timing chart in the case of executing a fading operation; (a) denotes a vertical sync signal; (b) indicates coefficient data which is supplied from the system controller 30 to the coefficient multiplier 24a; (c) shows the coefficient data which is supplied from the system controller 30 to the coefficient multiplier 24b.

The coefficient data which is supplied from the system controller 30 to the coefficient multiplier 24a in the case of the fade recording is synchronized with a vertical sync signal shown in FIG. 6(a). The values of the coefficient data which are assigned to the horizontal scanning periods in each field period are equalized as shown in FIG. 6(b). The value of the coefficient data is changed from "0" to "1.0" on the basis of the field period. On the other hand, the coefficient data which is supplied from the system controller 30 to the coefficient multiplier 24b is changed from "1.0" to "0". Due to this, fade images are displayed by the EVF unit 28 and recorded onto the recording medium.

As described above, in the video signal processing apparatus of the embodiment, upon wipe or fade recording of the video signal, the fact that the wipe or fade recording mode has been selected can be checked on the EVF unit and the object image which has been photographed by the image pickup unit at that time can be checked. Further, the wipe or fade images during the wipe or fade recording can be also checked. The using efficiency of the apparatus is extremely high.

The second and third embodiments of the invention will be described hereinbelow with reference to the drawings.

Figure 7:
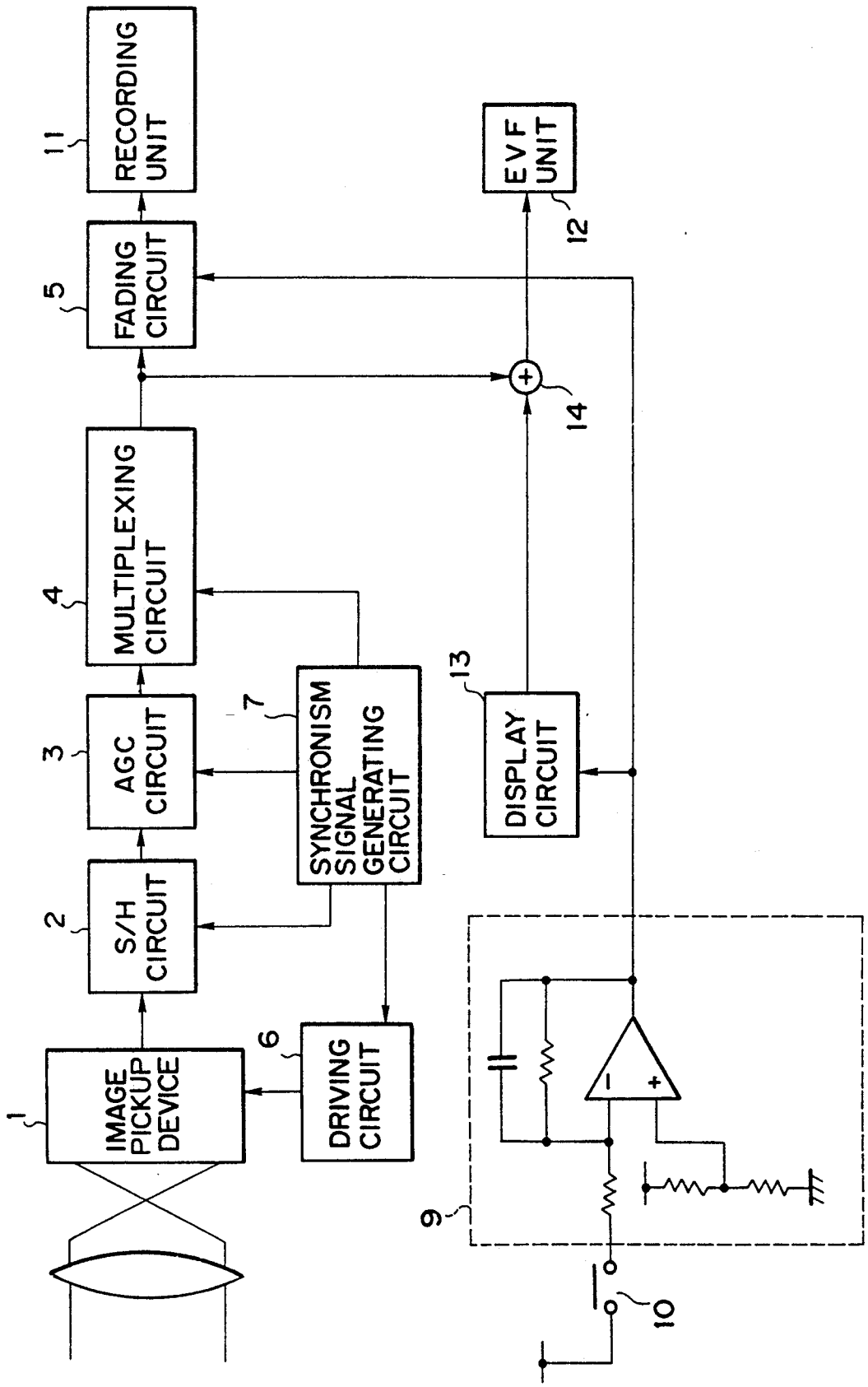
FIG. 7 is a block diagram showing a schematic construction of an image pickup apparatus as the second embodiment of the invention.
Figure 8:
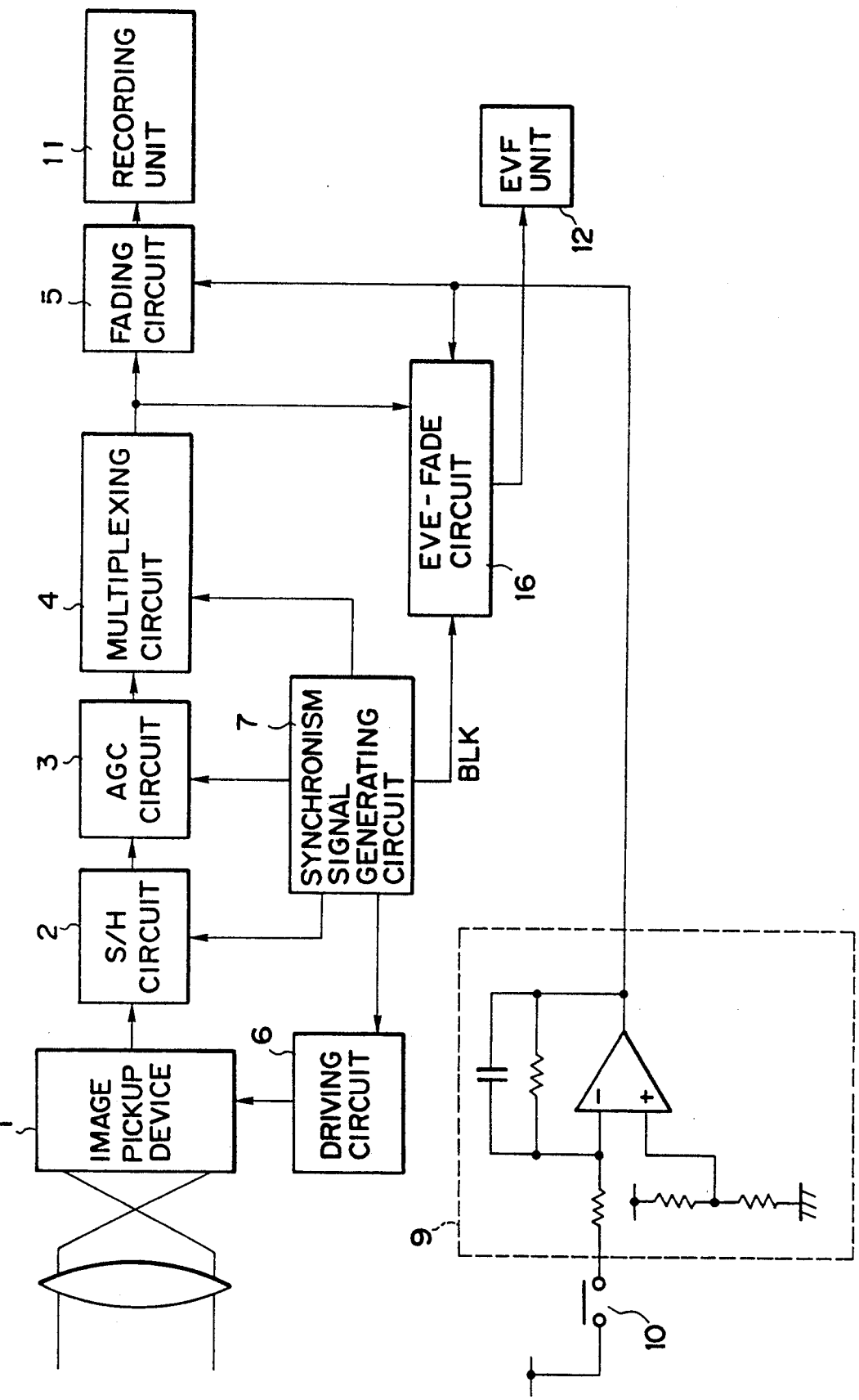
FIG. 8 is a block diagram showing a schematic construction of an image pickup apparatus as the third embodiment of the invention.
Figure 9A:
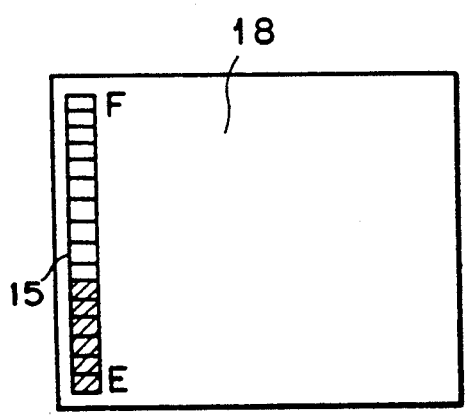
FIGS. 9A and 9B are diagrams showing display units of EVF units in the image pickup apparatuses shown in FIGS. 7 and 8.
Figure 9B:
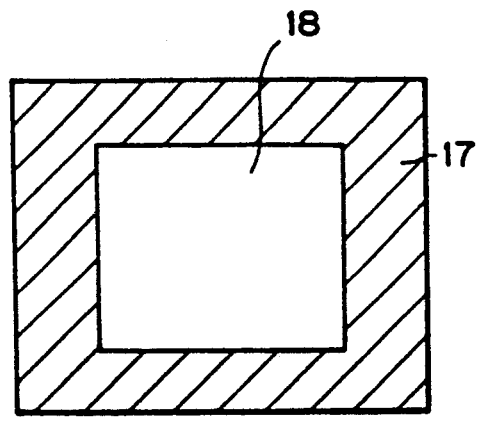

FIG. 7 is a constructional diagram showing a construction of an image pickup apparatus as the second embodiment of the invention. FIG. 8 is a constructional diagram showing a construction of an image pickup apparatus as the third embodiment of the invention. FIGS. 9A and 9B are diagrams showing display contents in the EVF unit of the invention. FIG. 9A shows a display content in the apparatus shown in FIG. 7. FIG. 9B shows a display content in the apparatus shown in FIG. 8.

Figure 1:
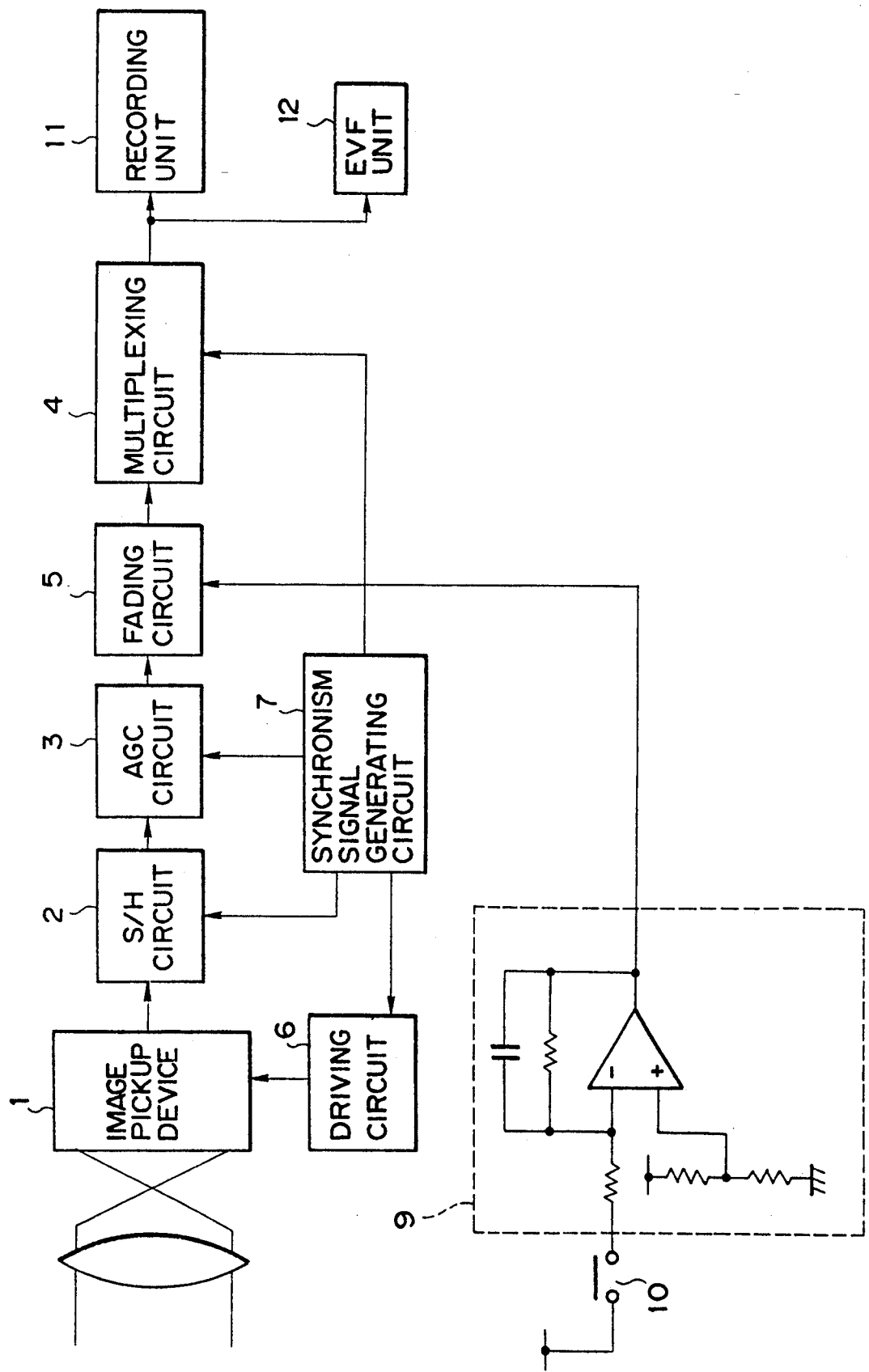
FIG. 1 is a block diagram showing a construction of a conventional image pickup apparatus.

In FIGS. 7 and 8, the parts and components which are the same as or correspond to those in the construction in the conventional apparatus shown in FIG. 1 are designated by the same reference numerals and their overlap descriptions are omitted.

The operation of the second embodiment of the invention will be described hereinbelow.

In FIG. 7, the video signal which was output from the image pickup device 1 is processed by the S/H circuit 2, AGC circuit 3, and multiplexing circuit 4 in a manner similar to the above. The video signal which was fade processed by the fading circuit 5 is supplied to the recording unit 11. On the other hand, the output signal from the multiplexing circuit 4 before it is supplied to the fading circuit 5 is input to the EVF unit 12 through an adder 14. When the photographer pushes the fading operation switch 10 (upon fading-out), a fade control signal is supplied to the fading circuit 5, the level of the video signal which is supplied from the multiplexing circuit 4 gradually decreases, and the video signal indicative of the whole white or black picture plane is output from the fading circuit 5 to the recording unit 11. On the contrary, when the fading operation switch 10 is released (upon fading-in) from the depressed state, the video signal which is supplied from the multiplexing circuit 4 is gradually output from the fading circuit 5 to the recording unit 11, and then the whole white or black picture plane gradually decreases. As mentioned above, since the video signal which is supplied to the EVF unit 12 is the signal which is not subjected to the fading process by the fading circuit 5, the photographing state of the video signal which is output from the image pickup device 1 can be always checked irrespective of the fade-out or fade-in operation. On the other hand, as shown in FIG. 9A, an indicator 15 whose display level changes in accordance with the fade control signal is provided for the display section of the EVF unit 12. In a display circuit 13 in FIG. 7, a display control signal corresponding to the fade control signal is generated. The display control signal is multiplexed to the video signal which is output from the multiplexing circuit 4 by the adder 14. The multiplexed signal from the adder 14 is supplied to the EVF unit 12. The display level of the indicator 15 is controlled by the display control signal. Due to this, even in the fading operation, the fade operating state can be checked by the display level of the indicator 15 in the EVF unit 12.

The third embodiment of the invention will now be described with reference to FIGS. 8, 9A and 9B.

In FIG. 8, the parts and components which are the same as or correspond to those in the construction in the conventional apparatus shown in FIG. 1 are designated by the same reference numerals and further descriptions are omitted.

The operation of the third embodiment of the invention will now be described hereinbelow.

In FIG. 8, the video signal which is output from the multiplexing circuit 4 is supplied to the fading circuit 5 and EVF fading circuit 16. The fading circuit 5 executes the fading process on the video signal in accordance with the fade control signal and outputs the fade processed signal to the recording unit 11. On the other hand, an EVF-fade circuit 16 fetches a blanking pulse BLK which is output from the synchronism signal generating circuit 7 and fade processes the video signal which is output from the multiplexing circuit 4 for only a period of time which is designated by the blanking pulse BLK and outputs the fade processed signal. As shown in FIG. 9B, the video image in the display section of the EVF unit 12 in the fading operation is fade processed for only a peripheral portion 17 of the display section of the EVF unit 12 corresponding to the period of time which is designated by the blanking pulse BLK. In a central portion 18 of the display section of the EVF unit 12, the video image which is shown by the video signal which is output from the image pickup device 1 can be always checked.

As a method of displaying the fade operating state as mentioned above, there have been described the display method using the indicator 15 provided near the display section of the EVF unit 12 as shown in FIG. 9A and the method of executing the fading process to only the video signal which is displayed in the peripheral portion 17 in the display section of the EVF unit 12 as shown in FIG. 9B. However, there can be also applied a method in which the fade operating state can be checked without executing the fading process to all of the video images which are displayed in the display section of the EVF unit 12.

As described above, according to the embodiment, in the case where the fading function of the image pickup apparatus was made operative, the video image which is displayed on the EVF unit is not faded but the photographed video image can be always checked. Further, the fade operating state can be checked, a photographing error upon fading-in is not caused, and the fading function can be sufficiently effected, and the photographing can be executed in the above state.

We claim:

1. A video signal processing apparatus for processing video signals, comprising:
   (A) multiplexing means for multiplexing a second video signal with a first video signal to provide a multiplexed video signal;
   (B) control means for controlling a multiplexing ratio of the first and second video signals in said multiplexing means; and
   (C) display means for simultaneously displaying at least a part of a video image of the first video signal and a part of an image corresponding to the multiplexed video signal being provided by said multiplexing means under control of said control means.

2. An apparatus according to claim 1, wherein said second video signal includes a fade image signal corresponding to a fade image.

3. An apparatus according to claim 1, wherein said multiplexing means is arranged so as to time sharingly multiplex the second video signal with the first video signal.

4. An apparatus according to claim 3, wherein said control means is arranged so as to control a ratio that the first video signal occupies in a video signal period of time of one picture plane and a ratio that the second video signal occupies in said video signal period of time.

5. An apparatus according to claim 1, wherein said multiplexing means is arranged so as to mix the first and second video signals.

6. An apparatus according to claim 5, wherein said control means is arranged so as to control a mixing ratio of the first and second video signals.

7. An apparatus according to claim 1, wherein said first video signal includes a pickup image signal corresponding to an object image.

8. A video signal processing apparatus for processing video signals, comprising:
   (A) multiplexing means for multiplexing a second video signal with a first video signal and with a plurality of multiplexing ratios outputting multiplexed video signals;
   (B) display means for displaying a video image corresponding to the multiplexed video signals which are output from said multiplexing means;
   (C) recording means for recording the multiplexed video signals which are output from said multiplexing means onto a recording medium; and
   (D) control means for controlling an operation of said multiplexing means to temporarily multiplex the first and second video signals with an equal multiplexing ratio in order to display said first and second video signals to be multiplexed before said multiplexing means starts to multiplex said first and second video signals with the plurality of multiplexing ratios.

9. An apparatus according to claim 8, wherein said second video signal includes a fade image signal corresponding to a fade image.

10. An apparatus according to claim 8, wherein said multiplexing means is arranged so as to time sharingly multiplex the second video signal with the first video signal.

11. An apparatus according to claim 10, wherein said control means is arranged so as to equalize the ratio that the first video signal occupies in a video signal period of time of one picture plane and the ratio that the second video signal occupies in said video signal period of time prior to the recording operation of the video signal in the recording means.

12. An apparatus according to claim 8, wherein said first video signal includes a pickup image signal corresponding to an object image.

13. An image pickup apparatus for photographing an object and generating a pickup image signal corresponding to the object, comprising:
   (A) fading means for fading-in or fading-out the pickup image signal;
   (B) control means for controlling the fading operation of the pickup image signal in the fading means; and
   (C) display means for simultaneously displaying at least a part of a video image of the pickup image signal and a part of an image corresponding to the pickup image signal being faded-in or faded-out by said fading means under control of said control means.

14. An image pickup apparatus for photographing an object and generating a pickup image signal corresponding to the object, comprising:
   (A) fading means for fading-in or fading-out the pickup image signal;
   (B) control means for controlling the fading operation of the pickup image signal in the fading means; and
   (C) display means having a first display section and a second display section, for displaying at least a part of a pickup video image corresponding to the pickup image signal at said first display section and displaying a fading state of the pickup image signal whose fading operation by said fading means is being controlled by said control means, at said second display section.

15. An image pickup apparatus for photographing an object and generating a pickup image signal corresponding to the object, comprising:
   (A) fading means for fading-in or fading-out the pickup image signal;
   (B) control means for controlling the fading operation of the pickup image signal in the fading means; and
   (C) an electric view finder having a first display area and a second display area, and for displaying at least a part of a pickup video image corresponding to the pickup image signal at said first display area and displaying at said second display area a part of a fade video image corresponding to the pickup image signal which was faded by the fading means.

* * * * *

UNITED STATES PATENT AND TRADEMARK OFFICE
CERTIFICATE OF CORRECTION

PATENT NO. : 5,287,187
DATED : February 15, 1994
INVENTOR(S) : Chikara SATO, et al.

It is certified that error appears in the above-indentified patent and that said Letters Patent is hereby corrected as shown below:

<u>TITLE PAGE</u>

<u>At [56], Under Heading "U.S. PATENT DOCUMENTS"</u>:
Line 12, "Dmoto et al." should read --Omoto et al.--.

<u>COLUMN 1</u>:
Line 12, "on" should read --on a--;
Line 13, "a" should be deleted;
Line 65, "with" should read --to--; and
Line 66, "to" should read --with--.

Signed and Sealed this

Fifteenth Day of November, 1994

Attest:

BRUCE LEHMAN

Attesting Officer   Commissioner of Patents and Trademarks